(12) United States Patent
Dallal et al.

(10) Patent No.: US 12,068,780 B2
(45) Date of Patent: Aug. 20, 2024

(54) BEAM MANAGEMENT USING AN OPTICAL BEACON

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/664,919

(22) Filed: May 25, 2022

(65) Prior Publication Data

US 2023/0388014 A1    Nov. 30, 2023

(51) Int. Cl.
*H04B 10/11*    (2013.01)

(52) U.S. Cl.
CPC ................... *H04B 10/11* (2013.01)

(58) Field of Classification Search
CPC ..................................... H04B 10/11
USPC ....................................... 398/118
See application file for complete search history.

(56) References Cited

U.S. PATENT DOCUMENTS

| | | | |
|---|---|---|---|
| 2016/0365900 A1* | 12/2016 | Kim | H04B 7/0469 |
| 2017/0195644 A1* | 7/2017 | Shatz | G06T 19/006 |
| 2018/0014208 A1* | 1/2018 | Guo | H04B 7/024 |
| 2018/0048442 A1* | 2/2018 | Sang | H04W 72/046 |
| 2020/0120565 A1* | 4/2020 | Cedergren | H04W 36/06 |
| 2020/0403738 A1* | 12/2020 | Zhou | H04B 7/088 |
| 2021/0320773 A1* | 10/2021 | Manolakos | G01S 5/0244 |
| 2022/0283259 A1* | 9/2022 | Tao | H04L 5/0023 |

FOREIGN PATENT DOCUMENTS

| | | | | |
|---|---|---|---|---|
| AU | 2011201986 A1 | * | 11/2011 | ........ H04B 10/112 |
| CN | 109565324 A | * | 4/2019 | ........ H04B 17/318 |
| CN | 107395273 B | * | 6/2020 | ........ H04B 10/112 |
| JP | 2017044756 A | * | 3/2017 | |
| JP | 2019204298 A | * | 11/2019 | |
| KR | 20190082912 A | * | 7/2019 | |

* cited by examiner

*Primary Examiner* — Abbas H Alagheband

(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may detect, using an image sensor, an optical beacon of a network node. The UE may receive reference signals using a sweep of a plurality of beams that is based at least in part on a relative direction of the optical beacon of the network node. Numerous other aspects are provided.

24 Claims, 12 Drawing Sheets

BEAM MANAGEMENT USING AN OPTICAL BEACON

FIELD OF THE DISCLOSURE

Aspects of the present disclosure generally relate to wireless communication and specifically, to techniques and apparatuses for beam management using an optical beacon.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Many wireless networks are increasing operating frequencies. As frequency increases, widths of beams used for communication may decrease linearly while a quantity of beams in a given area increases quadratically. With such a high quantity of beams, suitable angular coverage can be achieved by using wide beams with low gain and poor energy collection with reduced coverage (for example, due to small effective apertures of the beams) or by using numerous narrow beams at the cost of increased scanning overhead for beam management procedures.

SUMMARY

Some aspects described herein relate to a method of wireless communication performed by a user equipment (UE). The method may include detecting, using an image sensor, an optical beacon of a network node. The method may include receiving reference signals using a sweep of a plurality of beams that is based at least in part on a relative direction of the optical beacon of the network node.

Some aspects described herein relate to a method of wireless communication performed by a network node. The method may include detecting, using an image sensor, an optical beacon of at least one UE. The method may include transmitting reference signals using a sweep of a plurality of beams that is based at least in part on a relative direction of the optical beacon of the at least one UE.

Some aspects described herein relate to a UE for wireless communication. The UE may include at least one processor and at least one memory communicatively coupled with the at least one processor. The at least one processor may be configured to cause the UE to detect, using an image sensor, an optical beacon of a network node. The at least one processor may be configured to cause the UE to receive reference signals using a sweep of a plurality of beams that is based at least in part on a relative direction of the optical beacon of the network node.

Some aspects described herein relate to a network node for wireless communication. The network node may include at least one processor and at least one memory communicatively coupled with the at least one processor. The at least one processor may be configured to cause the network node to detect, using an image sensor, an optical beacon of at least one UE. The at least one processor may be configured to cause the network node to transmit reference signals using a sweep of a plurality of beams that is based at least in part on a relative direction of the optical beacon of the at least one UE.

Some aspects described herein relate to a non-transitory computer-readable medium that stores a set of instructions for wireless communication by a UE. The set of instructions, when executed by one or more processors of the UE, may cause the UE to detect, using an image sensor, an optical beacon of a network node. The set of instructions, when executed by one or more processors of the UE, may cause the UE to receive reference signals using a sweep of a plurality of beams that is based at least in part on a relative direction of the optical beacon of the network node.

Some aspects described herein relate to a non-transitory computer-readable medium that stores a set of instructions for wireless communication by a network node. The set of instructions, when executed by one or more processors of the network node, may cause the network node to detect, using an image sensor, an optical beacon of at least one UE. The set of instructions, when executed by one or more processors of the network node, may cause the network node to transmit reference signals using a sweep of a plurality of beams that is based at least in part on a relative direction of the optical beacon of the at least one UE.

Some aspects described herein relate to an apparatus for wireless communication. The apparatus may include means for detecting, using an image sensor, an optical beacon of a network node. The apparatus may include means for receiving reference signals using a sweep of a plurality of beams that is based at least in part on a relative direction of the optical beacon of the network node.

Some aspects described herein relate to an apparatus for wireless communication. The apparatus may include means for detecting, using an image sensor, an optical beacon of at least one UE. The apparatus may include means for transmitting reference signals using a sweep of a plurality of beams that is based at least in part on a relative direction of the optical beacon of the at least one UE.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
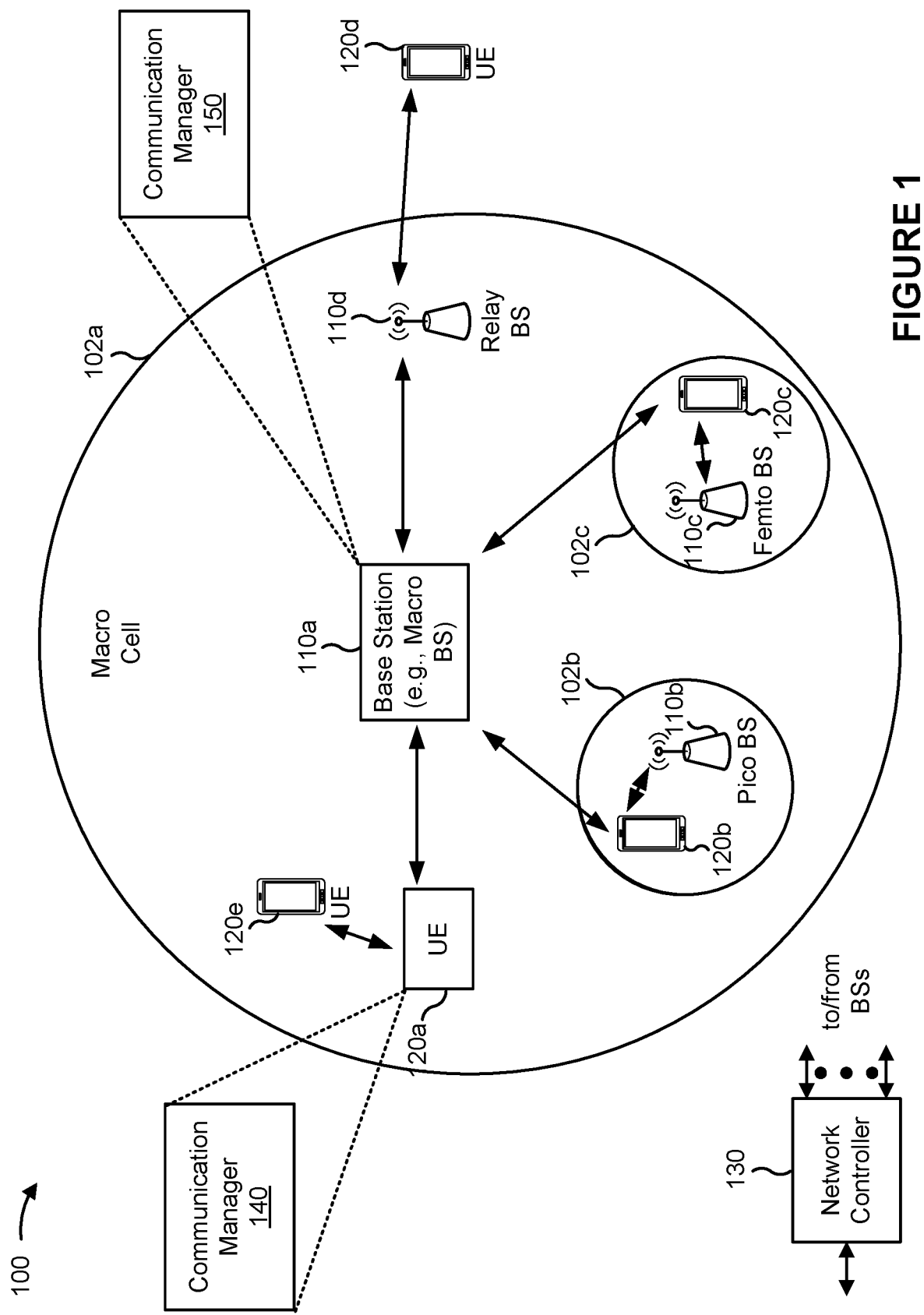
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to reducing a quantity of beams used in beam sweeping for beam management. Some aspects more specifically relate to using an optical beacon for coarse beam selection or refinement. In some aspects, a network node may activate an optical beacon, and a user equipment (UE) may detect the optical beacon of the network node using an image sensor to determine a relative direction of the optical beacon from the UE. Accordingly, the UE may receive reference signals using a sweep of a plurality of beams that is based at least in part on the relative direction. Similarly, in some aspects, one or more UEs may activate optical beacons, and a network node may detect the optical beacons of the one or more UEs using an image sensor to determine relative directions of the optical beacons from the network node. Accordingly, the network node may transmit reference signals using a sweep of a plurality of beams that is based at least in part on the relative directions.

Particular aspects of the subject matter described in this disclosure can be implemented to realize one or more of the following potential advantages. In some examples, the described techniques can be used to reduce a quantity of beams used for beam sweeping. For example, beam sweeping may use a reduced quantity of beams associated with a higher beam density in the relative direction(s) that are determined, and a lower beam density in directions other than the relative direction(s). In this way, beam management may be performed faster, thereby reducing latency associated with initial beam acquisition or beam refinement, and conserving computing resources that would otherwise be used for beam sweeping that uses a greater quantity of beams. Thus, this faster beam management facilitates improved beam management, for example, for sub-THz beams.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 gigahertz (GHz)) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some cases, high frequency bands may be referred to as sub-terahertz (THz) frequency bands. Sub-THz frequency bands may refer to frequency bands in the range from 100 GHz to 300 GHz, among other examples.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may detect, using an image sensor, an optical beacon of a network node; and receive reference signals using a sweep of a plurality of beams that is based at least in part on a relative direction of the optical beacon of the network node. Additionally or alternatively, the communication manager 140 may perform one or more other operations described herein.

In some aspects, a network node (for example, base station 110) may include a communication manager 150. As described in more detail elsewhere herein, the communication manager 150 may detect, using an image sensor, an optical beacon of at least one UE; and transmit reference signals using a sweep of a plurality of beams that is based at least in part on a relative direction of the optical beacon of the at least one UE. Additionally or alternatively, the communication manager 150 may perform one or more other operations described herein.

Figure 2:
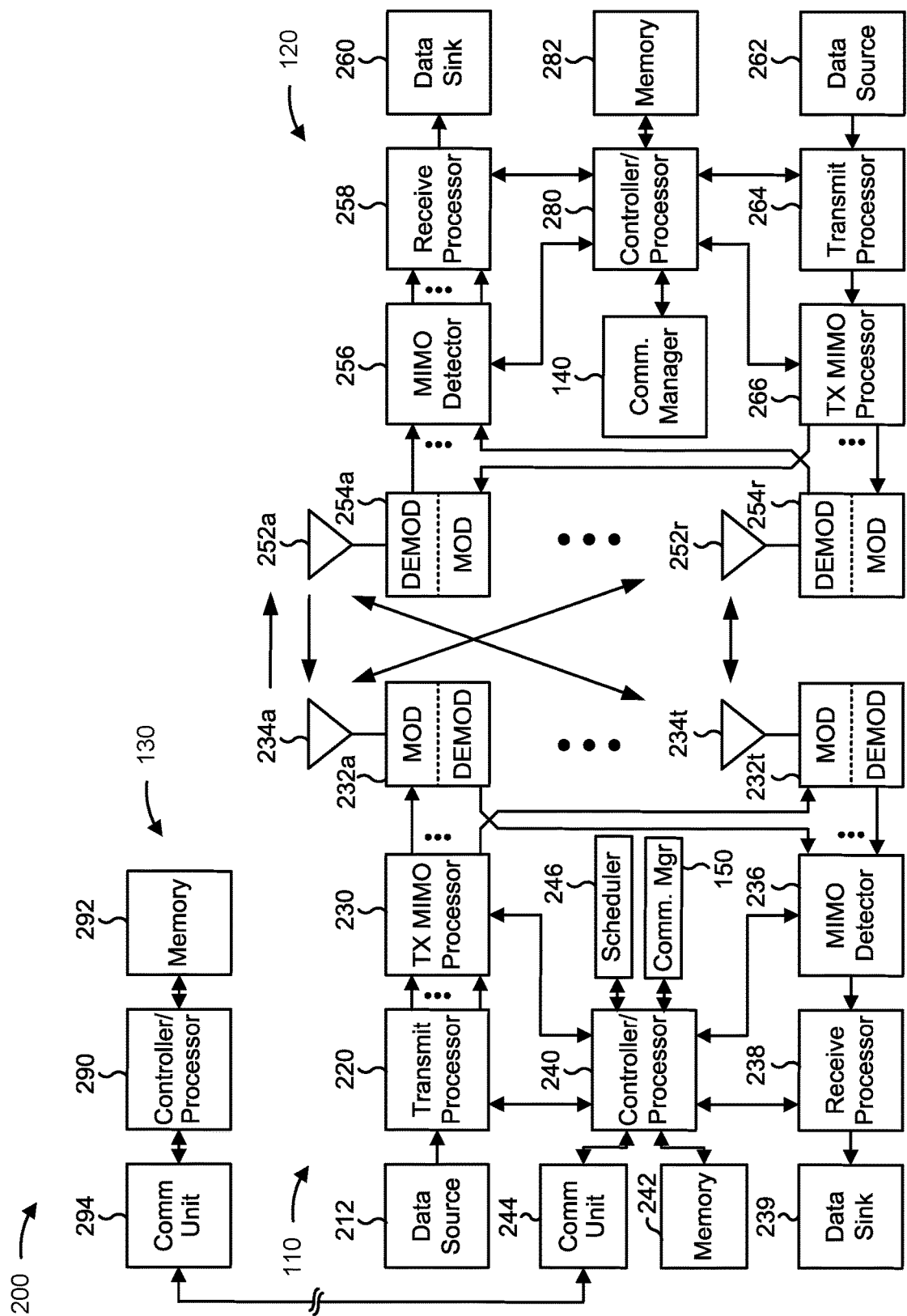
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234$a$ through 234$t$, such as T antennas (T≥1). The UE 120 may be equipped with a set of antennas 252$a$ through 252$r$, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232$a$ through 232$t$. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232$a$ through 232$t$ may transmit a set of downlink signals (for example, T downlink signals) via a corresponding set of antennas 234 (for example, T antennas), shown as antennas 234$a$ through 234$t$.

At the UE 120, a set of antennas 252 (shown as antennas 252$a$ through 252$r$) may receive the downlink signals from the base station 110 or other base stations 110 and may provide a set of received signals (for example, R received signals) to a set of modems 254 (for example, R modems), shown as modems 254$a$ through 254$r$. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with beam management using an optical beacon, as described in more detail elsewhere herein. In some aspects, a network node described herein is the base station 110, is included in the base station 110, or includes one or more components of the base station 110 shown in FIG. 2. The controller/processor 240 of the base station 110, the controller/processor 280 of the UE 120, or any other component(s) of FIG. 2 may perform or direct operations of, for example, process 900 of FIG. 9, process 1000 of FIG. 10, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, a UE 120 includes means for detecting, using an image sensor, an optical beacon of a network node; or means for receiving reference signals using a sweep of a plurality of beams that is based at least in part on a relative direction of the optical beacon of the network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, a base station 110) includes means for detecting, using an image sensor, an optical beacon of at least one UE; or means for transmitting reference signals using a sweep of a plurality of beams that is based at least in part on a relative direction of the optical beacon of the at least one UE. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
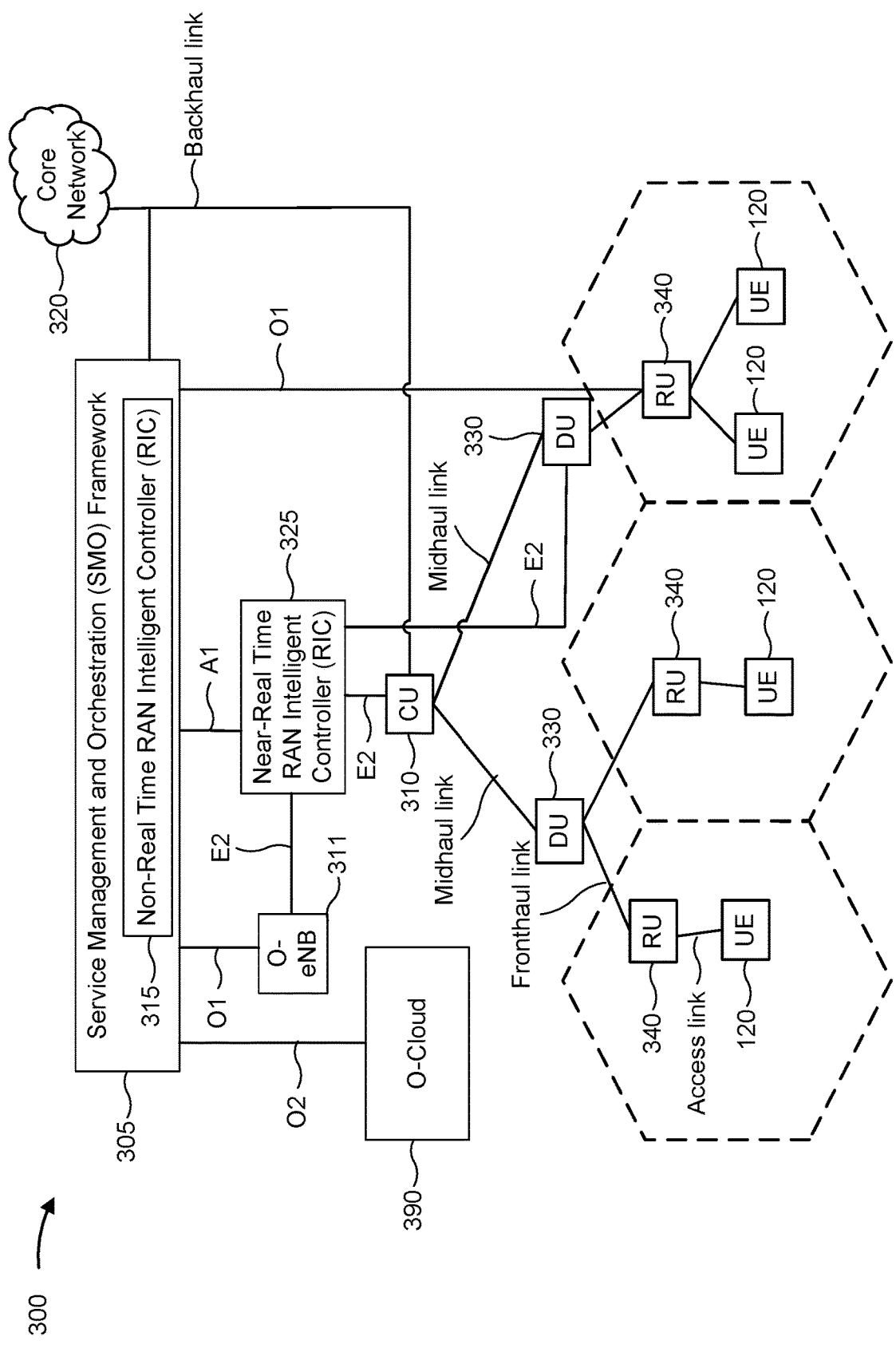
FIG. 3 is a diagram illustrating an example disaggregated base station architecture in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT MC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
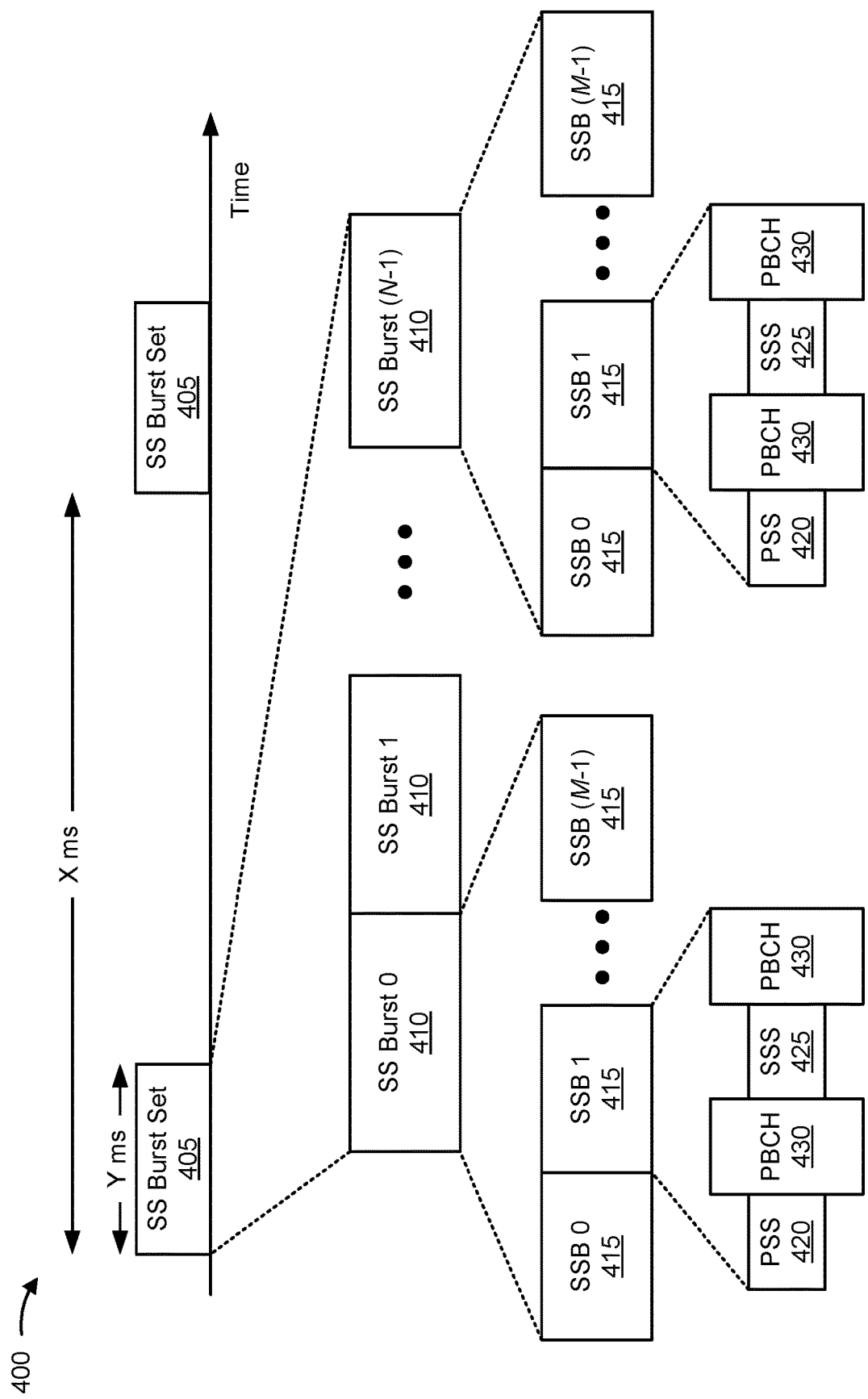
FIG. 4 is a diagram illustrating an example of a synchronization signal hierarchy in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (for example, transmitted using different beams), and may be used for cell search, cell acquisition, beam management, or beam selection (for example, as part of an initial network access procedure). An SS burst set 405 may be periodically transmitted by a wireless node (for example, base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, or a physical broadcast channel (PBCH) 430. In some aspects, multiple SSBs 415 are included in an SS burst 410 (for example, with transmission on different beams), and the PSS 420, the SSS 425, or the PBCH 430 may be the same across each SSB 415 of the SS burst 410. In some aspects, a single SSB 415 may be included in an SS burst 410. In some aspects, the SSB 415 may be at least four symbols (for example, OFDM symbols) in length, where each symbol carries one or more of the PSS 420 (for example, occupying one symbol), the SSS 425 (for example, occupying one symbol), or the PBCH 430 (for example, occupying two symbols). In some aspects, an SSB 415 may be referred to as an SS/PBCH block.

In some aspects, the symbols of an SSB 415 are consecutive, as shown in FIG. 4. In some other aspects, the symbols of an SSB 415 are non-consecutive. Similarly, in some aspects, one or more SSBs 415 of the SS burst 410 may be transmitted in consecutive radio resources (for example, consecutive symbols) during one or more slots. Additionally or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (for example, base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for or measure SSBs 415 using different receive (Rx) beams during an initial network access procedure or a cell search procedure, among other examples. Based at least in part on the monitoring or measuring, the UE 120 may indicate one or more SSBs 415 with a best signal parameter (for example, an RSRP parameter) to a base station 110. The base station 110 and the UE 120 may use the one or more indicated SSBs 415 to select one or more beams to be used for communication between the base station 110 and the UE 120 (for example, for a random access channel (RACH) procedure). Additionally or alternatively, the UE 120 may use the SSB 415 or the SSB index to determine a cell timing for a cell via which the SSB 415 is received (for example, a serving cell).

Figure 5:
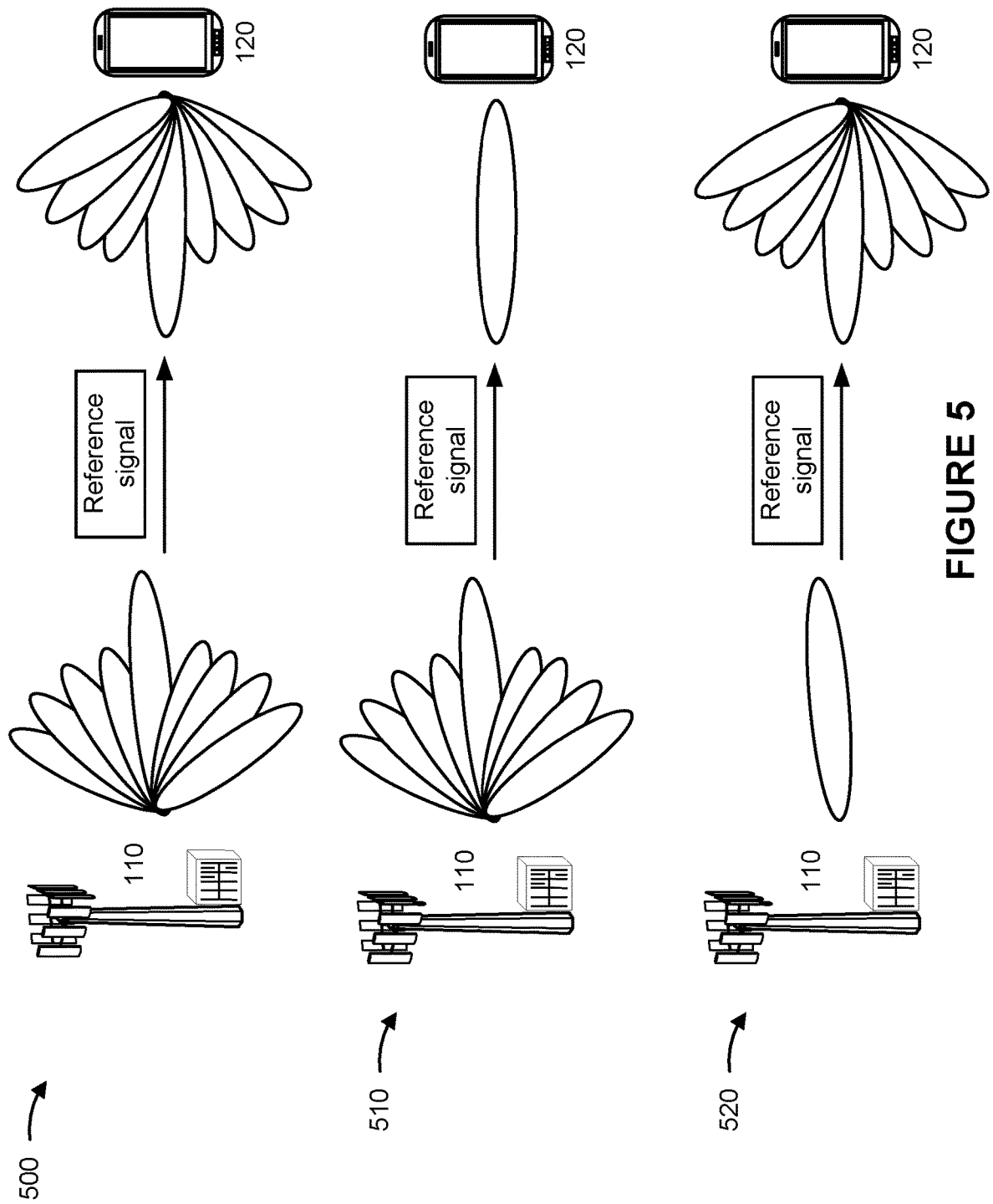
FIG. 5 is a diagram illustrating examples of beam management procedures in accordance with the present disclosure.

FIG. 5 is a diagram illustrating examples 500, 510, and 520 of beam management procedures, in accordance with the present disclosure. As shown in FIG. 5, examples 500, 510, and 520 include a UE 120 in communication with a base station 110 in a wireless network (for example, wireless network 100). However, the devices shown in FIG. 5 are provided as examples, and the wireless network may support communication and beam management between other devices (for example, between a UE 120 and a base station 110 or TRP, between a mobile termination node and a control node, between an IAB child node and an IAB parent node, or between a scheduled node and a scheduling node). In some aspects, the UE 120 and the base station 110 may be in a connected state (for example, an RRC connected state).

As shown in FIG. 5, example 500 may include a base station 110 and a UE 120 communicating to perform beam management using reference signals, such as channel state information reference signals (CSI-RSs) or SSBs. Example 500 depicts a first beam management procedure (for example, P1 beam management). The first beam management procedure may be referred to as a beam selection procedure, an initial beam acquisition procedure, a beam sweeping procedure, a cell search procedure, or a beam search procedure. As shown in FIG. 5 and example 500, reference signals may be configured to be transmitted from the base station 110 to the UE 120. The reference signals may be configured to be periodic (for example, using RRC signaling), semi-persistent (for example, using media access control (MAC) control element (MAC-CE) signaling), or aperiodic (for example, using downlink control information (DCI)).

The first beam management procedure may include the base station 110 performing beam sweeping over multiple transmit (Tx) beams. The base station 110 may transmit a reference signal using each transmit beam for beam management. To enable the UE 120 to perform Rx beam sweeping, the base station may use a transmit beam to transmit (for example, with repetitions) each reference signal at multiple times within the same reference signal (RS) resource set so that the UE 120 can sweep through receive beams in multiple transmission instances. For example, if the base station 110 has a set of N transmit beams and the UE 120 has a set of M receive beams, the reference signal may be transmitted on each of the N transmit beams M times so that the UE 120 may receive M instances of the reference signal per transmit beam. In other words, for each transmit beam of the base station 110, the UE 120 may perform beam sweeping through the receive beams of the UE 120. As a result, the first beam management procedure may enable the UE 120 to measure a reference signal on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120.

As shown in FIG. 5, example 510 may include a base station 110 and a UE 120 communicating to perform beam management using reference signals. Example 510 depicts a second beam management procedure (for example, P2 beam management). The second beam management procedure may be referred to as a beam refinement procedure, a base station beam refinement procedure, a TRP beam refinement procedure, or a transmit beam refinement procedure. As shown in FIG. 5 and example 510, reference signals may be configured to be transmitted from the base station 110 to the UE 120. The reference signals may be configured to be aperiodic (for example, using DCI). The second beam management procedure may include the base station 110 performing beam sweeping over one or more transmit beams. The one or more transmit beams may be a subset of all transmit beams associated with the base station 110 (for example, determined based at least in part on measurements reported by the UE 120 in connection with the first beam management procedure). The base station 110 may transmit a reference signal using each transmit beam of the one or more transmit beams for beam management. The UE 120 may measure each reference signal using a single (for example, a same) receive beam (for example, determined based at least in part on measurements performed in connection with the first beam management procedure). The second beam management procedure may enable the base station 110 to select a best transmit beam based at least in part on measurements of the reference signals (for example, measured by the UE 120 using the single receive beam) reported by the UE 120.

As shown in FIG. 5, example 520 depicts a third beam management procedure (for example, P3 beam management). The third beam management procedure may be referred to as a beam refinement procedure, a UE beam refinement procedure, or a receive beam refinement procedure. As shown in FIG. 5 and example 520, one or more reference signals may be configured to be transmitted from the base station 110 to the UE 120. The reference signals may be configured to be aperiodic (for example, using DCI). The third beam management process may include the base station 110 transmitting the one or more reference signals using a single transmit beam (for example, determined based at least in part on measurements reported by the UE 120 in connection with the first beam management procedure or the second beam management procedure). To enable the UE 120 to perform receive beam sweeping, the base station may use a transmit beam to transmit (for example, with repetitions) a reference signal at multiple times within the same RS resource set so that UE 120 can sweep through one or more receive beams in multiple transmission instances. The one or more receive beams may be a subset of all receive beams associated with the UE 120 (for example, determined based at least in part on measurements performed in connection with the first beam management procedure or the second beam management procedure). The third beam management procedure may enable the base station 110 or the UE 120 to select a best receive beam based at least in part on reported measurements received from the UE 120 (for example, of the reference signal of the transmit beam using the one or more receive beams).

Other examples of beam management procedures may differ from what is described with respect to FIG. 5. For example, the UE 120 and the base station 110 may perform the third beam management procedure before performing the second beam management procedure, or the UE 120 and the base station 110 may perform a similar beam management procedure to select a UE transmit beam.

Many wireless networks are increasing operating frequencies, for example, from millimeter wave (mmW) frequencies to sub-THz frequencies. As frequency increases, beam widths decrease linearly while a quantity of beams in a given area increases quadratically. For example, by increasing an operating frequency from 28 GHz to 140 GHz, beam width decreases by a factor of 5, and a quantity of beams in a particular array area increases by a factor of 25. With such a high quantity of beams, suitable angular coverage can be achieved by using wide beams with low gain and poor energy collection with reduced coverage (for example, due to small effective apertures of the beams) or by using numerous narrow beams at the cost of increased scanning overhead for beam management procedures. Thus, to improve beam management, a wireless network may supplement beam sweeping information using information such as global positioning system (GPS) information, RAT positioning information (for example, based on sub-6 GHz frequencies, based on mmW frequencies, or based on sub-THz frequencies), information from sensor fusion of multiple sensors, localized handover information, or road traffic control information (for example, V2X information), among other examples.

In some cases, beam management procedures using beam sweeping may be inefficient for sub-THz frequencies. For example, for a 240 kHz subcarrier spacing (SCS), a maximum quantity of unique beams (which may be referred to as "Lmax") per SSB burst may be 64 beams. At sub-THz frequencies, an SCS may be 960 kHz, which would increase the maximum quantity of unique beams to 256 per SSB burst (and the beam sweep duration of the SSB burst remains the same). Moreover, for a base station (or a component of a disaggregated base station) covering an azimuthal section of 60 degrees with a ±15 degree elevation, and using beams with a coverage of 2 degrees by 2 degrees and 50% overlap, there may be over 1800 beams that would need to be swept (or "scanned"). If a smallest periodicity for SSB bursts is 5 ms, then sweeping through the over 1800 beams would take approximately 40 ms. In the same scenario, but using beams with a coverage of 1 degree by 1 degree, there may be over 7200 partially overlapping beams, which would take about 140 ms at a 960 kHz SCS to sweep through or 840 ms at a 240 kHz SCS to sweep through. Accordingly, at sub-THz frequencies, beam management procedures may increase latency and may consume excessive computing resources.

Various aspects relate generally to reducing a quantity of beams used in beam sweeping for beam management. Some aspects more specifically relate to using an optical beacon for coarse beam selection or refinement. In some aspects, a network node may activate an optical beacon, and a UE may detect the optical beacon of the network node using an image sensor to determine a relative direction of the optical beacon from the UE. Accordingly, the UE may receive reference signals using a sweep of a plurality of beams that is based at least in part on the relative direction. Similarly, in some aspects, one or more UEs may activate optical beacons, and a network node may detect the optical beacons of the one or more UEs using an image sensor to determine relative directions of the optical beacons from the network node. Accordingly, the network node may transmit reference signals using a sweep of a plurality of beams that is based at least in part on the relative directions.

Particular aspects of the subject matter described in this disclosure can be implemented to realize one or more of the following potential advantages. In some examples, the described techniques can be used to reduce a quantity of beams used for beam sweeping. For example, beam sweeping may use a reduced quantity of beams associated with a higher beam density in the relative direction(s) that are determined, and a lower beam density in directions other than the relative direction(s). In this way, beam management may be performed faster, thereby reducing latency associated with initial beam acquisition or beam refinement, and conserving computing resources that would otherwise be used for beam sweeping that uses a greater quantity of beams. Thus, this faster beam management facilitates improved beam management, for example, for sub-THz beams.

Figure 6:
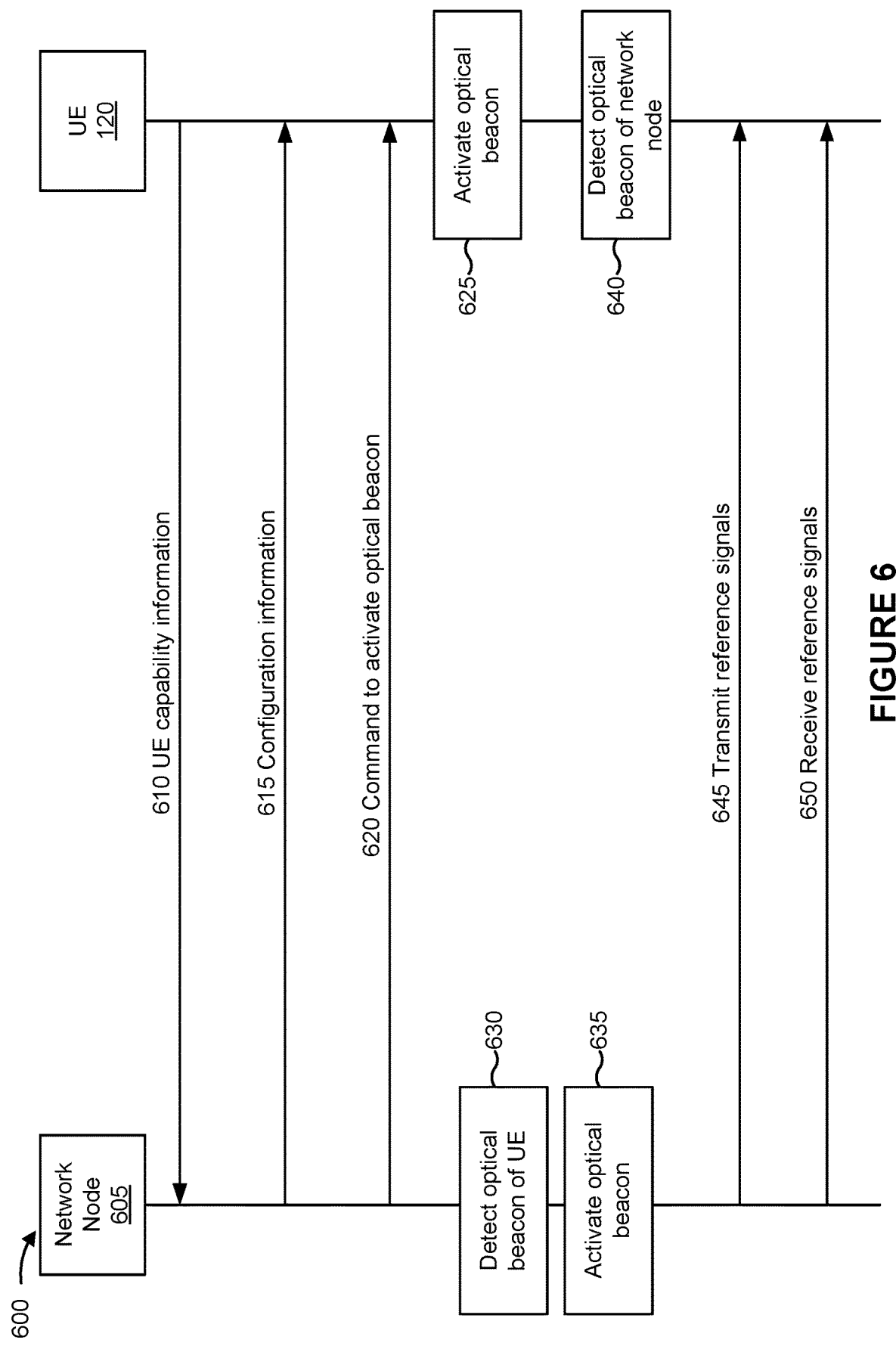
FIGS. 6-8 are diagrams illustrating examples associated with beam management using an optical beacon in accordance with the present disclosure.

FIG. 6 is a diagram illustrating an example 600 associated with beam management using an optical beacon, in accordance with the present disclosure. As shown in FIG. 6, example 600 relates to communications of a network node 605 and a UE 120. The network node 605 may be, or may include, a base station 110 or one or more components of a disaggregated base station, such as a CU 310, a DU 330, or an RU 340, among other examples.

The UE 120 may include an optical beacon. Additionally or alternatively, the UE 120 may include at least one image sensor (for example, a camera). The network node 605 also may include an optical beacon. Additionally or alternatively, the network node 605 may include at least one image sensor (for example, a camera). The optical beacon of the UE 120 or the optical beacon of the network node 605 may be configured to emit infrared light. For example, the optical beacon of the UE 120 or the optical beacon of the network node 605 may be a light emitting diode (LED) configured to emit infrared light. The optical beacon of the network node 605 may be located at an antenna of the network node 605.

The image sensor of the UE 120 or the image sensor of the network node 605 may be configured to detect infrared light. Moreover, the image sensor of the UE 120 or the image sensor of the network node 605 may have a relatively low pixel count (for example, a relatively low resolution). A detection area of each pixel of the image sensor of the UE 120 may correspond to a typical (for example, an average) beam width of the UE 120 to facilitate detection of light from the optical beacon of the network node 605. The image sensor of the network node 605 may have a relatively wide field of view to facilitate detection of optical beacons of multiple UEs. In some aspects, the image sensor of the UE 120 or the image sensor of the network node 605 may have a field of view of at least 100 degrees (for example, which corresponds to, or is larger than, an angular coverage of beam steering antennas). In some aspects, the image sensor of the UE 120 or the image sensor of the network node 605 may have a frame rate of at least 120 Hz (for example, low pixel count may facilitate high frame rate).

In some aspects, the optical beacon of the UE 120 or the optical beacon of the network node 605 may be configured to emit light in a spectral region that is relatively narrow and in which solar radiation noise is low. For example, the optical beacon of the UE 120 or the optical beacon of the network node 605 may be configured to emit light wavelengths in a range from about 850 nanometers (nm) to about 1000 nm or in a range from about 1250 nm to about 1500 nm. In some aspects, the image sensor of the UE 120 may be configured to detect light in the spectral region used by the optical beacon of the network node 605 or the image sensor of the network node 605 may be configured to detect light in the spectral region used by the optical beacon of the UE 120. In some aspects, the image sensor of the UE 120 may be a silicon-based image sensor (for example, a low-sensitivity sensor) configured to detect light wavelengths in a range from about 850 nm to about 1000 nm. In some aspects, the image sensor of the network node 605 may be an indium-gallium-arsenide-based image sensor (for example, a high-sensitivity sensor) configured to detect light wavelengths in a range from about 1250 nm to about 1500 nm. In some aspects, the image sensor of the UE 120 or the image sensor of the network node 605 may be used with an optical bandpass filter configured to reject frequencies associated with interference (for example, solar interference).

In a first operation 610, the UE 120 may transmit, and the network node 605 may receive, UE capability information. The UE capability information may indicate one or more capabilities of the UE 120. In some aspects, the UE capability information may indicate a capability of the UE 120 to detect the optical beacon of the network node 605 or a capability of the UE 120 to activate the optical beacon of the UE 120.

In a second operation 615, the network node 605 may transmit, and the UE 120 may receive, configuration information. For example, the network node 605 may transmit, and the UE 120 may receive, the configuration information via RRC signaling (for example, the configuration information may be associated with an RRC configuration). In some aspects, the configuration information may identify one or more differentiating characteristics associated with the optical beacon of the network node 605. For example, the differentiating characteristics may include a timing associated with activation of the optical beacon of the network node 605, a pattern of pulses in which the optical beacon of the network node 605 is to be activated, or a light wavelength associated with the optical beacon of the network node 605, among other examples. In some aspects, the configuration information may identify one or more activation parameters for the optical beacon of the UE 120. For example, the activation parameters may include a timing associated with activation of the optical beacon of the UE 120, a pattern of pulses in which the optical beacon of the UE 120 is to be activated, or a light wavelength associated with the optical beacon of the UE 120, among other examples.

In a third operation 620, the network node 605 may transmit, and the UE 120 may receive, a command to activate (for example, to illuminate) the optical beacon of the UE 120. In some aspects, the network node 605 may command (for example, instruct) multiple UEs (including the UE 120) to activate optical beacons. The multiple UEs may include UEs that are located in different directions from each other relative to the network node 605. In some aspects, the network node 605 may command all UEs (or all UEs of a particular type) in a cell of the network node 605 to activate optical beacons. In a fourth operation 625, the UE 120 may activate (for example, illuminate) the optical beacon of the UE 120 responsive to the command from the network node 605. In some aspects, multiple UEs (including the UE 120) that were commanded to activate optical beacons may activate optical beacons.

In a fifth operation 630, the network node 605 may detect the optical beacon of the UE 120 (as well as the optical beacons of one or more other UEs). That is, the network node 605 may detect the optical beacon of the UE 120 using the image sensor of the network node 605. Based at least in part on detecting the optical beacon of the UE 120, the network node 605 may determine a relative direction of the optical beacon of the UE 120 (that is, a direction of the optical beacon of the UE 120 relative to the network node 605). For example, the network node 605 may determine the relative direction of the optical beacon of the UE 120 based at least in part on a location of one or more pixels of the image sensor of the network node 605 at which the optical beacon of the UE 120 is detected. In some aspects, based at least in part on the relative direction of the optical beacon of the UE 120 (or the optical beacons of the multiple UEs), the network node 605 may determine one or more antenna panels or one or more beams that are to be used (for example, one or more antenna panels or one or more beams that correspond to relative directions of the optical beacons of the multiple UEs).

In a sixth operation 635, the network node 605 may activate (for example, illuminate) the optical beacon of the network node 605. In some aspects, the network node 605 may activate the optical beacon of the network node 605 during an SSB transmission period. In some other aspects, the network node 605 may activate the optical beacon of the network node 605 following a beam indication relating to a lower-frequency band, such as a sub-6 GHz band or a mmW band.

In a seventh operation 640, the UE 120 may detect the optical beacon of the network node 605. That is, the UE 120 may detect the optical beacon of the network node 605 using the image sensor of the UE 120. Based at least in part on detecting the optical beacon of the network node 605, the UE 120 may determine a relative direction of the optical beacon of the network node 605 (that is, a direction of the optical beacon of the network node 605 relative to the UE 120). For example, the UE 120 may determine the relative direction of the optical beacon of the network node 605 based at least in part on a location of one or more pixels of the image sensor of the UE 120 at which the optical beacon of the network node 605 is detected. In some aspects, based at least in part on the relative direction of the optical beacon of the network node 605, the UE 120 may determine an antenna panel or a beam that is to be used (for example, an antenna panel or a beam that corresponds to the relative direction of the optical beacon of the network node 605).

In some aspects, the UE 120 may detect the optical beacon of the network node 605 and an optical beacon of at least one other network node. In some other aspects, the UE 120 may falsely detect the optical beacon of the network node 605 (for example, if the UE 120 falsely detects interference as the optical beacon of the network node 605). In these cases, the UE 120 may identify the optical beacon of the network node 605 based at least in part on the one or more differentiating characteristics associated with the optical beacon of the network node 605, as described herein. For example, the UE 120 may identify (for example, positively identify) the optical beacon of the network node 605 based at least in part on a timing of activation of the optical beacon of the network node 605, a pattern of pulses in which the optical beacon of the network node 605 is activated, or a light wavelength associated with the optical beacon of the network node 605, among other examples.

In an eighth operation 645, the network node 605 may transmit reference signals (for example, CSI-RSs or SSBs, among other examples), that are to be received by the UE 120, using a sweep of a plurality of beams (for example, a plurality of transmit beams). The sweep of the plurality of beams may be based at least in part on the relative direction of the optical beacon of the UE 120. In some aspects, the sweep of the plurality of beams may be based at least in part on the relative directions of the optical beacons of the multiple UEs. For example, the sweep of the plurality of beams may include only beams that are directed at the relative direction(s). In other words, the sweep of the plurality of beams may omit beams that are directed in directions other than the relative direction(s). As another example, the sweep of the plurality of beams may include a greater quantity of beams directed at the relative direction(s) (for example, a greater quantity of relatively narrower beams), and a lesser quantity of beams directed in directions other than the relative direction(s) (for example, a lesser quantity of relatively wider beams). In this way, the sweep of the plurality of beams includes fewer beams (for example, includes less than all possible beams) in accordance with the relative direction(s).

In some aspects, the network node 605 may transmit the reference signals using the sweep of the plurality of beams immediately following detection of the optical beacon(s) of the UE(s), as described in connection with operation 630. In some aspects, the plurality of beams may be mmW beams or sub-THz beams. In some aspects, frequencies of the plurality of beams may be at least 100 GHz or in a range from about 24 GHz to about 140 GHz.

In a ninth operation 650, the UE 120 may receive reference signals, that are transmitted by the network node 605, using a sweep of a plurality of beams (for example, a plurality of receive beams). The sweep of the plurality of beams may be based at least in part on the relative direction of the optical beacon of the network node 605. For example, the sweep of the plurality of beams may include only beams that are directed at the relative direction. In other words, the sweep of the plurality of beams may omit beams that are directed in directions other than the relative direction. As another example, the sweep of the plurality of beams may include a greater quantity of beams directed at the relative direction (for example, a greater quantity of relatively narrower beams), and a lesser quantity of beams directed in directions other than the relative direction (for example, a lesser quantity of relatively wider beams). In this way, the sweep of the plurality of beams includes fewer beams (for example, includes less than all possible beams) in accordance with the relative direction. In some aspects, the plurality of beams may be mmW beams or sub-THz beams. In some aspects, frequencies of the plurality of beams may be at least 100 GHz or in a range from about 24 GHz to about 140 GHz.

In some aspects, the sweep of the plurality of beams by the network node 605 and the sweep of the plurality of beams by the UE 120 may be used for the same beam management procedure (for example, an initial acquisition beam management procedure, as described in connection with FIG. 5). For example, the reference signals transmitted by the network node 605 in the sweep of the plurality of beams may be received by the UE 120 in the sweep of the plurality of beams. In some other aspects, the sweep of the plurality of beams by the network node 605 may be used for a different beam management procedure than a beam management procedure for which the sweep of the plurality of beams by the UE 120 is used. In some aspects, the sweep of the plurality of beams by the network node 605 may be used for an initial beam acquisition procedure (that is, a P1 beam management procedure) or a transmit beam refinement procedure (that is, a P2 beam management procedure), as described in connection with FIG. 5. In some aspects, the sweep of the plurality of beams by the UE 120 may be used for a receive beam refinement procedure (that is, a P3 beam management procedure), as described in connection with FIG. 5.

In this way, techniques described herein facilitate beam sweeping using a reduced quantity of beams. Accordingly, beam management may be performed faster, thereby reducing latency associated with initial beam acquisition or beam refinement, and conserving computing resources that would otherwise be used for beam sweeping that uses a greater quantity of beams. In particular, techniques described herein provide coarse beam selection using an optical approach to thereby reduce the quantity of beams used for beam sweeping to a manageable amount. For example, an image sensor described herein facilitates the coarse beam selection by enabling an environment to be characterized (for example, to detect the direction(s) that are needed for beams) from a single frame, or a few frames, of the image sensor rather than in a time-consuming raster fashion (for example, that is used by beam sweeping). Moreover, the image sensor facilitates the coarse beam selection independent of beam angular coverage and in a fixed time period regardless of beam angular coverage or beam width. Thus, this faster beam management facilitates beam management for sub-THz beams, which are associated with narrower beam width.

Figure 7:
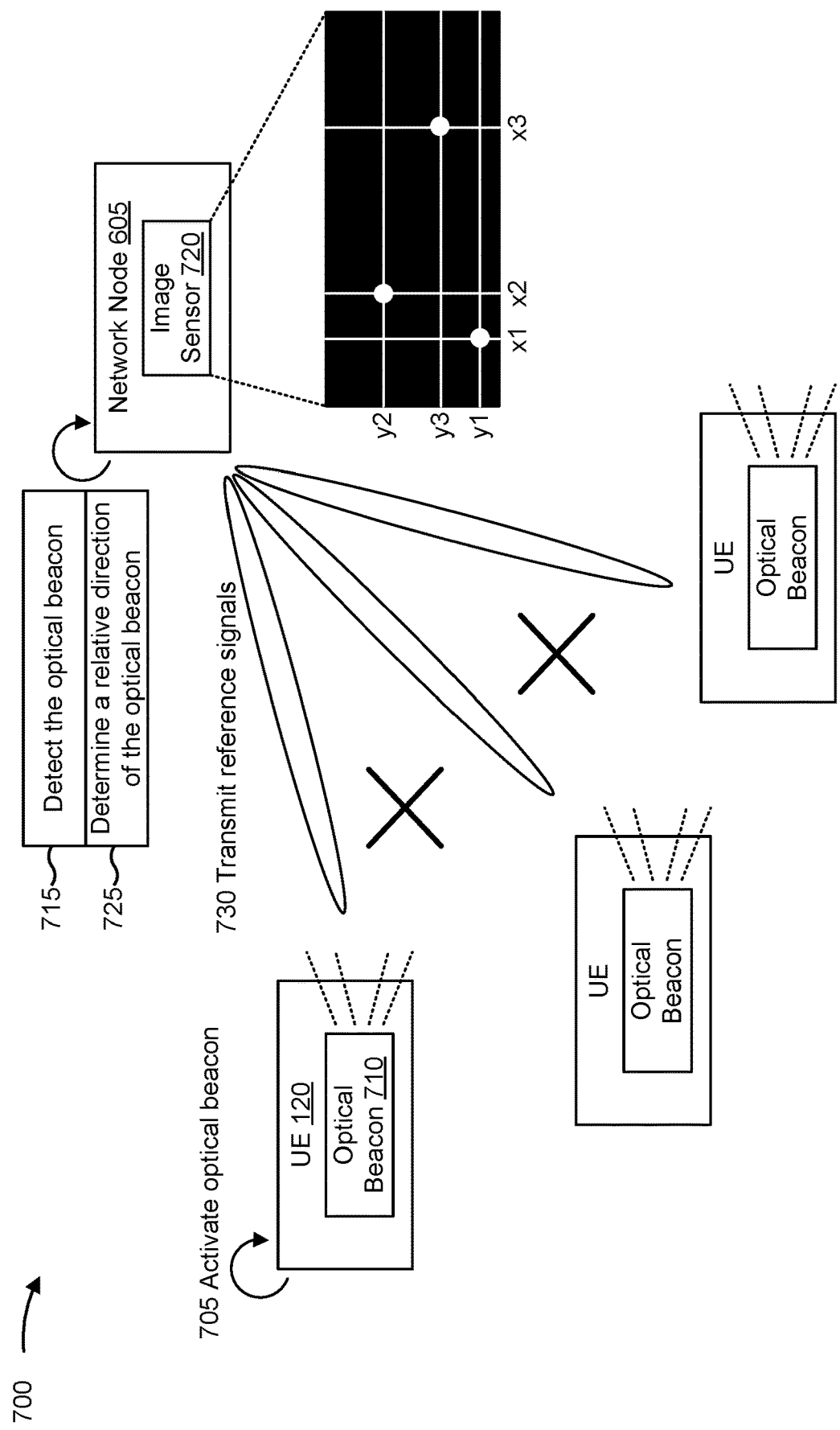

FIG. 7 is a diagram illustrating an example 700 associated with beam management using an optical beacon, in accordance with the present disclosure. As shown in FIG. 7, example 700 relates to communications of the network node 605 and the UE 120, as described in connection with FIG. 6.

In a first operation 705, the UE 120 may activate the optical beacon 710 of the UE 120 (for example, responsive to a command to activate the optical beacon 710), as described herein. As shown, one or more other UEs may also activate optical beacons. In a second operation 715, the network node 605 may detect, using an image sensor 720, the optical beacon 710 of the UE 120, as described herein. For example, the image sensor 720 may detect, at one or more pixels associated with location x1, y1 of the image sensor 720, the optical beacon 710 of the UE 120. As shown, the image sensor 720 may also detect optical beacons of the one or more other UEs at one or more pixels associated with location x2, y2 and location x3, y3, respectively, of the image sensor 720. In a third operation 725, the network node 605 may determine a relative direction of the optical beacon 710 of the UE 120 based at least in part on detecting the optical beacon 710 of the UE 120, as described herein. Moreover, the network node 605 may determine relative directions of optical beacons of the one or more other UEs based at least in part on detecting the optical beacons of the one or more other UEs. In a fourth operation 730, the network node 605 may transmit reference signals using a sweep of a plurality of beams that is based at least in part on the relative direction(s) determined by the network node 605, as described herein.

Figure 8:
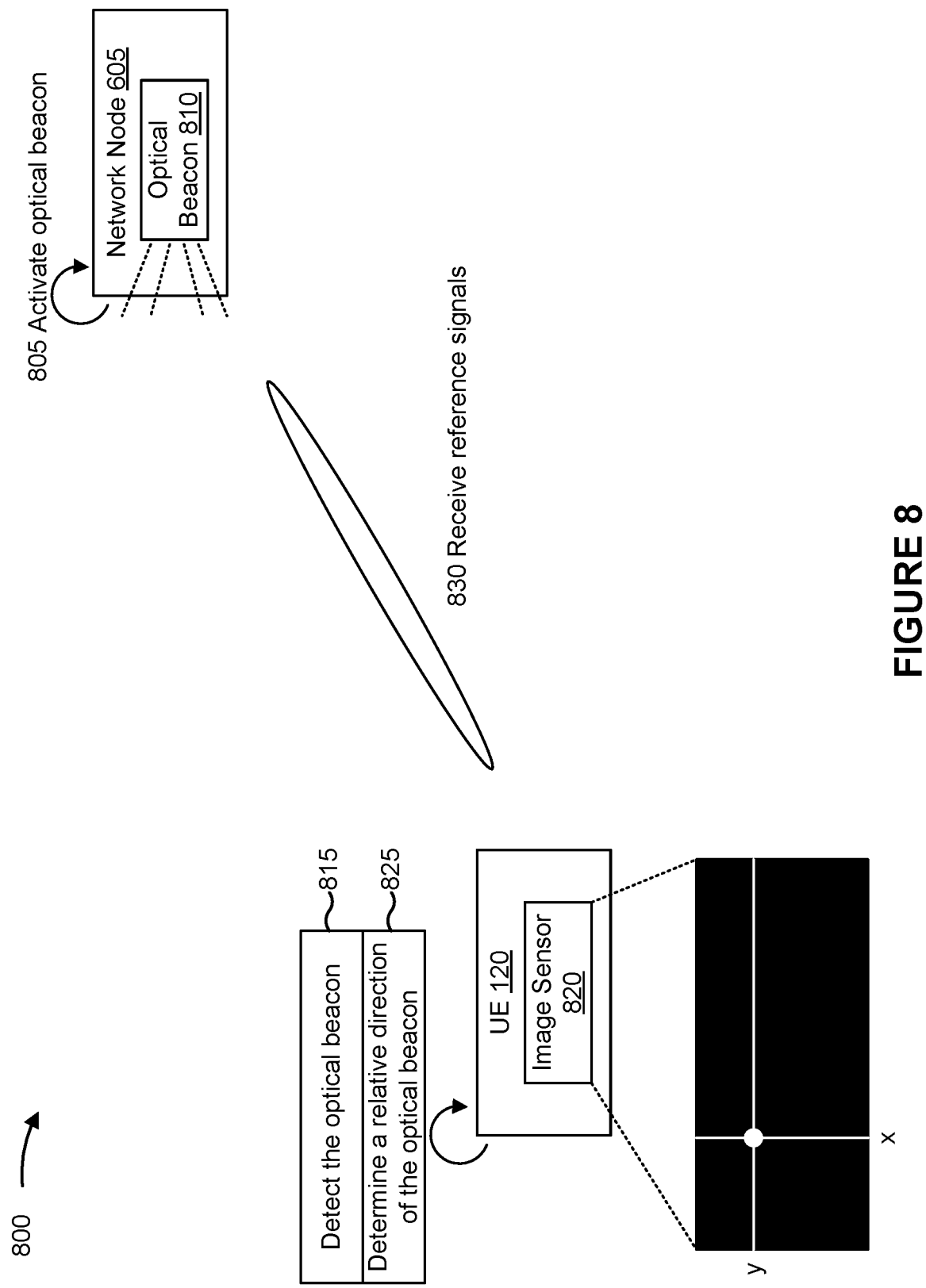

FIG. 8 is a diagram illustrating an example 800 associated with beam management using an optical beacon, in accordance with the present disclosure. As shown in FIG. 8, example 800 relates to communications of the network node 605 and the UE 120, as described in connection with FIG. 6.

In a first operation 805, the network node 605 may activate the optical beacon 810 of the network node 605, as described herein. In a second operation 815, the UE 120 may detect, using an image sensor 820, the optical beacon 810 of the network node 605, as described herein. For example, the image sensor 820 may detect, at one or more pixels associated with location x, y of the image sensor 820, the optical beacon 810 of the network node 605. In a third operation 825, the UE 120 may determine a relative direction of the optical beacon 810 of the network node 605 based at least in part on detecting the optical beacon 810 of the network node 605, as described herein. In a fourth operation 830, the UE 120 may receive reference signals using a sweep of a plurality of beams that is based at least in part on the relative direction determined by the UE 120, as described herein.

Figure 9:
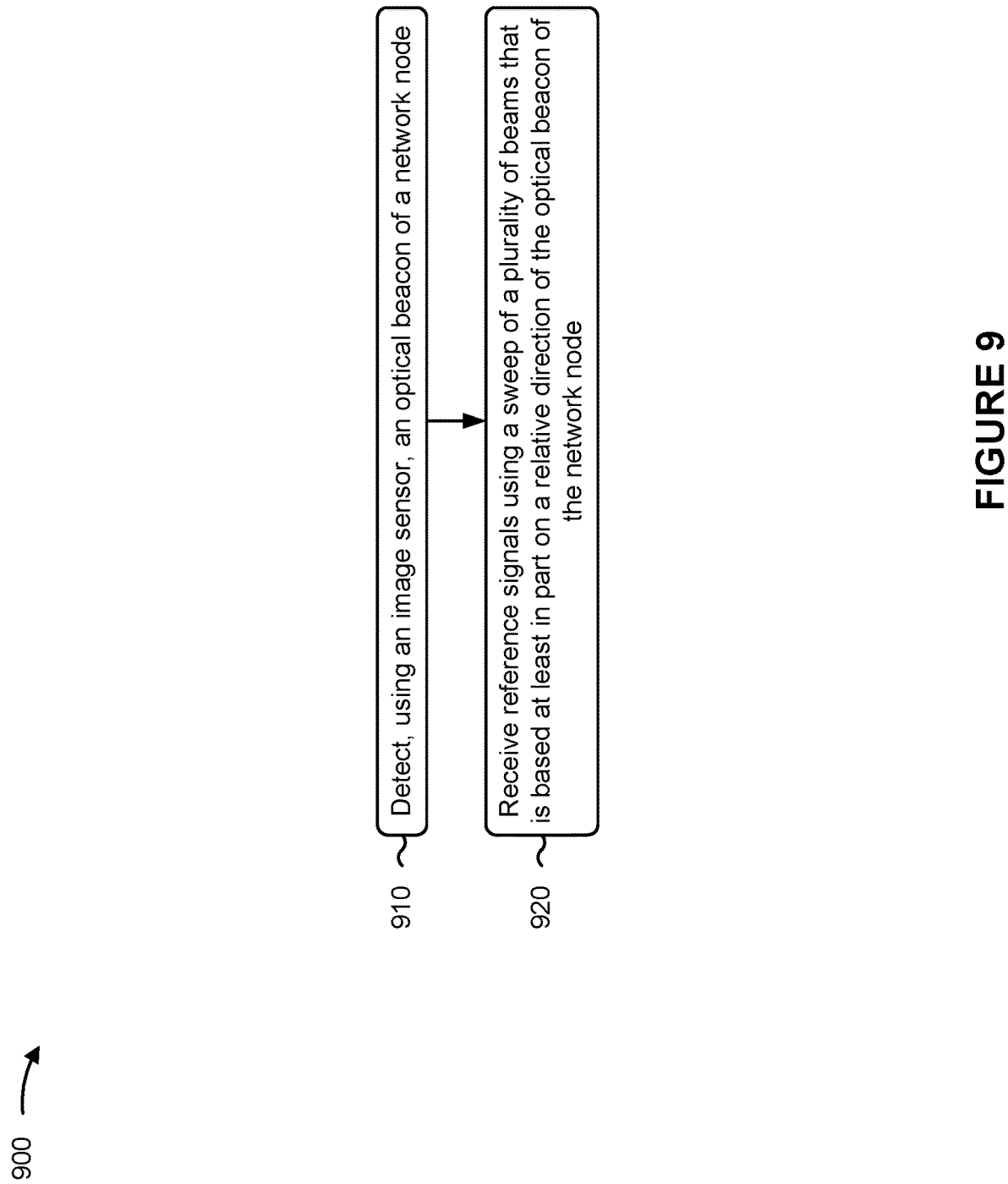
FIG. 9 is a flowchart illustrating an example process performed, for example, by a UE in accordance with the present disclosure.

FIG. 9 is a flowchart illustrating an example process 900 performed, for example, by a UE in accordance with the present disclosure. Example process 900 is an example where the UE (for example, UE 120) performs operations associated with beam management using an optical beacon.

As shown in FIG. 9, in some aspects, process 900 may include detecting, using an image sensor, an optical beacon of a network node (block 910). For example, the UE (such as by using communication manager 140 or detection component 1108, depicted in FIG. 11) may detect, using an image sensor, an optical beacon of a network node, as described above.

As further shown in FIG. 9, in some aspects, process 900 may include receiving reference signals using a sweep of a plurality of beams that is based at least in part on a relative direction of the optical beacon of the network node (block 920). For example, the UE (such as by using communication manager 140 or reception component 1102, depicted in FIG. 11) may receive reference signals using a sweep of a plurality of beams that is based at least in part on a relative direction of the optical beacon of the network node, as described above.

Process 900 may include additional aspects, such as any single aspect or any combination of aspects described below or in connection with one or more other processes described elsewhere herein.

In a first additional aspect, frequencies of the plurality of beams are at least 100 gigahertz.

In a second additional aspect, alone or in combination with the first aspect, the optical beacon uses infrared light.

Figure 11:
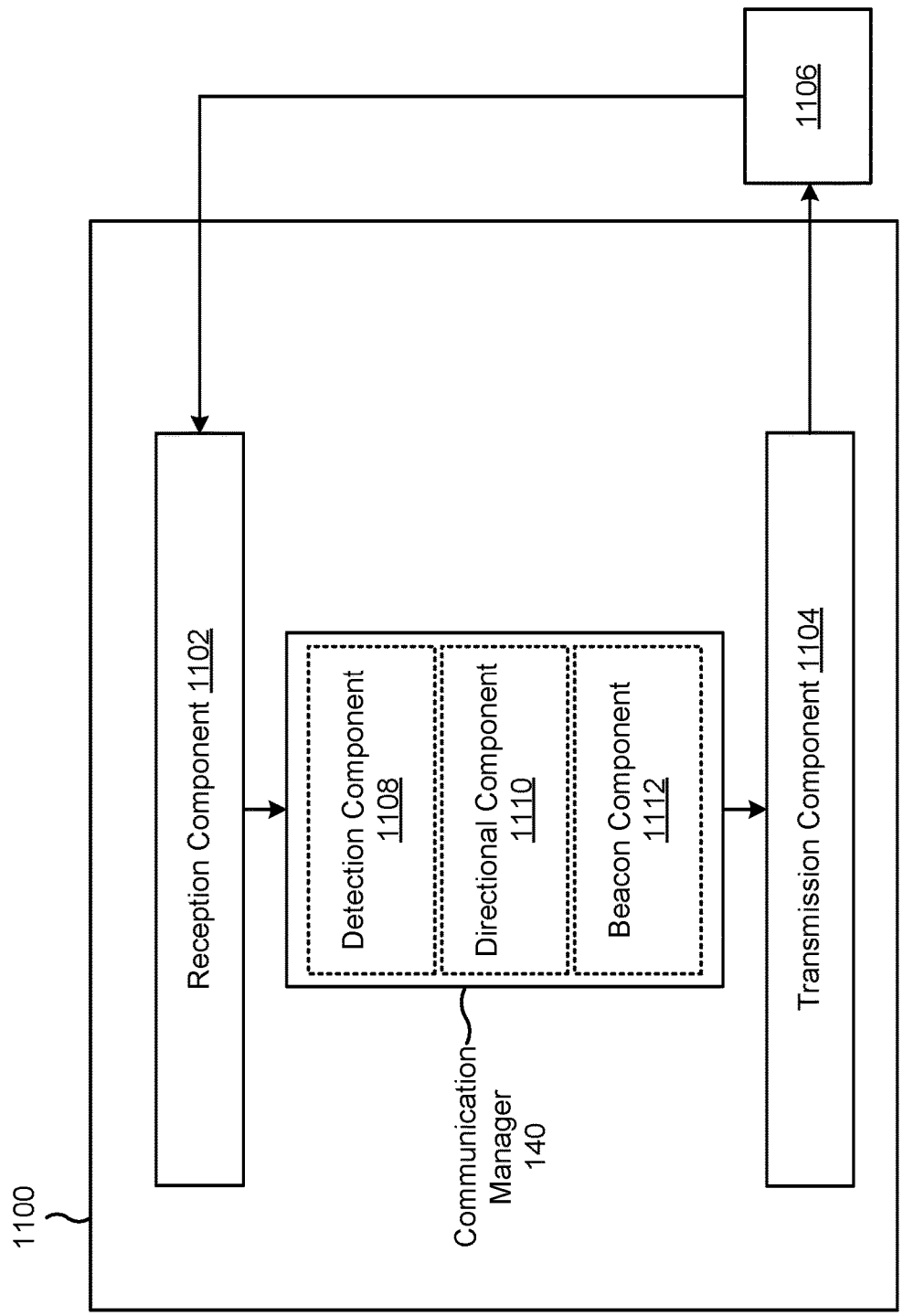
FIGS. 11-12 are diagrams of example apparatuses for wireless communication in accordance with the present disclosure.

In a third additional aspect, alone or in combination with one or more of the first and second aspects, process 900 includes receiving (such as by using communication manager 140 or reception component 1102, depicted in FIG. 11) a command to activate an optical beacon of the UE.

In a fourth additional aspect, alone or in combination with one or more of the first through third aspects, process 900 includes transmitting (such as by using communication manager 140 or transmission component 1104, depicted in FIG. 11) UE capability information indicating at least one of a capability of the UE to detect the optical beacon of the network node, or a capability of the UE to activate an optical beacon of the UE.

In a fifth additional aspect, alone or in combination with one or more of the first through fourth aspects, process 900 includes determining (such as by using communication manager 140 or directional component 1110, depicted in FIG. 11) the relative direction of the optical beacon of the network node based at least in part on detecting the optical beacon of the network node.

In a sixth additional aspect, alone or in combination with one or more of the first through fifth aspects, detecting the optical beacon of the network node includes detecting the optical beacon of the network node and an optical beacon of at least one other network node, and identifying (such as by using communication manager 140 or detection component 1108, depicted in FIG. 11) the optical beacon of the network node based at least in part on one or more differentiating characteristics associated with the optical beacon of the network node.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
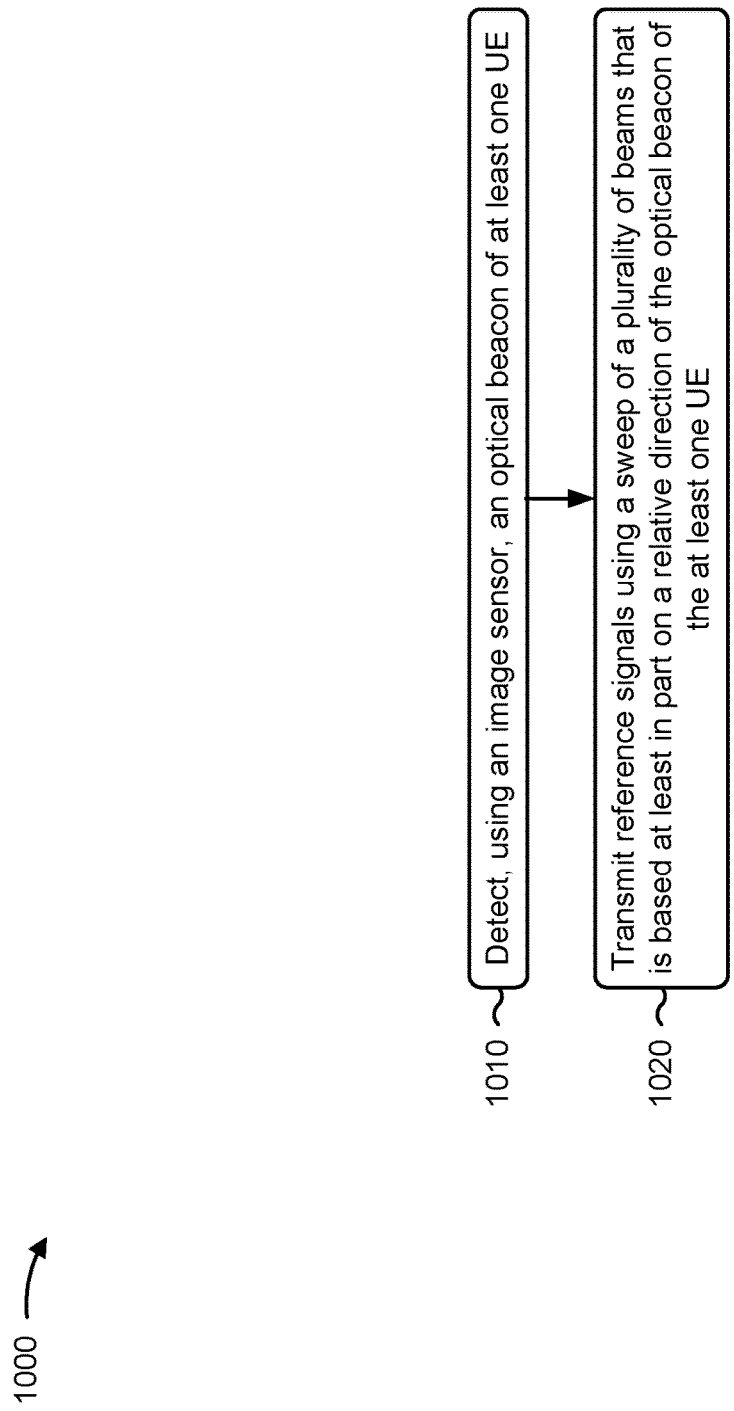
FIG. 10 is a flowchart illustrating an example process performed, for example, by a network node in accordance with the present disclosure.

FIG. 10 is a flowchart illustrating an example process 1000 performed, for example, by a network node in accordance with the present disclosure. Example process 1000 is an example where the network node (for example, base station 110 or network node 605) performs operations associated with beam management using an optical beacon.

As shown in FIG. 10, in some aspects, process 1000 may include detecting, using an image sensor, an optical beacon of at least one UE (block 1010). For example, the network node (such as by using communication manager 1250 or detection component 1208, depicted in FIG. 12) may detect, using an image sensor, an optical beacon of at least one UE, as described above.

As further shown in FIG. 10, in some aspects, process 1000 may include transmitting reference signals using a sweep of a plurality of beams that is based at least in part on a relative direction of the optical beacon of the at least one UE (block 1020). For example, the network node (such as by using communication manager 1250 or transmission component 1204, depicted in FIG. 12) may transmit reference signals using a sweep of a plurality of beams that is based at least in part on a relative direction of the optical beacon of the at least one UE, as described above.

Process 1000 may include additional aspects, such as any single aspect or any combination of aspects described below or in connection with one or more other processes described elsewhere herein.

In a first additional aspect, frequencies of the plurality of beams are at least 100 gigahertz.

In a second additional aspect, alone or in combination with the first aspect, the optical beacon uses infrared light.

Figure 12:
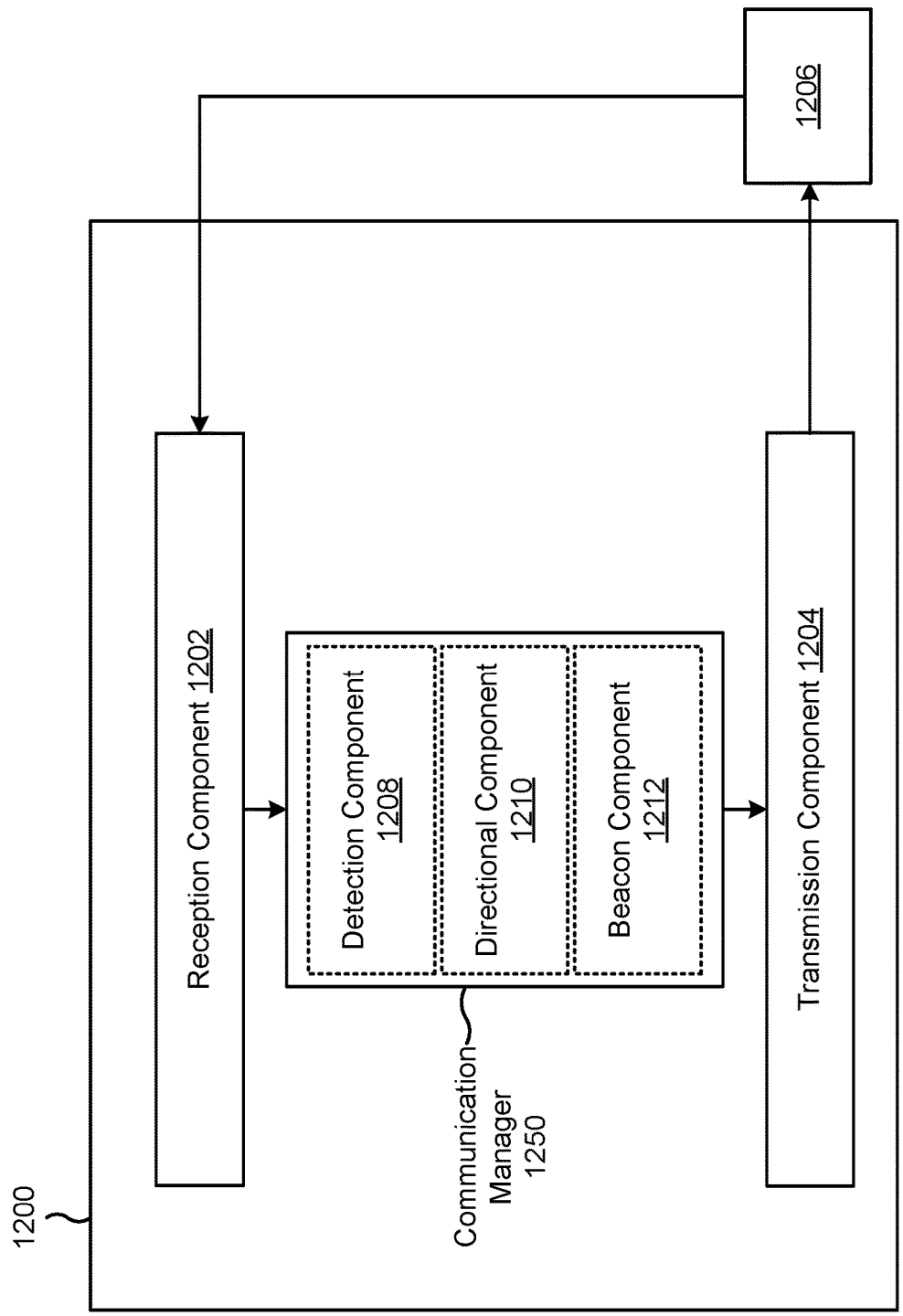

In a third additional aspect, alone or in combination with one or more of the first and second aspects, process 1000 includes transmitting (such as by using communication manager 1250 or transmission component 1204, depicted in FIG. 12) a command to activate the optical beacon of the at least one UE.

In a fourth additional aspect, alone or in combination with one or more of the first through third aspects, process 1000 includes receiving (such as by using communication manager 1250 or reception component 1202, depicted in FIG. 12) UE capability information indicating at least one of a capability of the at least one UE to detect an optical beacon of the network node, or a capability of the at least one UE to activate the optical beacon of the at least one UE.

In a fifth additional aspect, alone or in combination with one or more of the first through fourth aspects, process 1000 includes determining (such as by using communication manager 1250 or directional component 1210, depicted in FIG. 12) the relative direction of the optical beacon of the at least one UE based at least in part on detecting the optical beacon of the at least one UE.

In a sixth additional aspect, alone or in combination with one or more of the first through fifth aspects, the at least one UE includes multiple UEs, and the sweep of the plurality of beams is based at least in part on relative directions of multiple optical beacons of the multiple UEs.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

FIG. 11 is a diagram of an example apparatus 1100 for wireless communication in accordance with the present disclosure. The apparatus 1100 may be a UE, or a UE may include the apparatus 1100. In some aspects, the apparatus 1100 includes a reception component 1102, a transmission component 1104, and a communication manager 140, which may be in communication with one another (for example, via one or more buses). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 6-8. Additionally or alternatively, the apparatus 1100 may be configured to perform one or more processes described herein, such as process 900 of FIG. 9, or a combination thereof. In some aspects, the apparatus 1100 may include one or more components of the UE described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 140. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, the communication manager 140 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The communication manager 140 may detect an optical beacon of a network node. The communication manager 140 may receive or may cause the reception component 1102 to receive reference signals using a sweep of a plurality of beams that is based at least in part on a relative direction of the optical beacon of the network node. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a detection component 1108, a directional component 1110, a beacon component 112, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The detection component 1108 may detect, using an image sensor, an optical beacon of a network node. The detection component 1108 may identify the optical beacon of the network node based at least in part on one or more differentiating characteristics associated with the optical beacon of the network node. The reception component 1102 may receive reference signals using a sweep of a plurality of beams that is based at least in part on a relative direction of the optical beacon of the network node. The reception component 1102 may receive a command to activate an optical beacon of the UE. The beacon component 1112 may activate the optical beacon. The transmission component 1104 may transmit UE capability information indicating at least one of a capability of the UE to detect the optical beacon of the network node, or a capability of the UE to activate an optical beacon of the UE. The directional component 1110 may determine the relative direction of the optical beacon of the network node based at least in part on detecting the optical beacon of the network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

FIG. 12 is a diagram of an example apparatus 1200 for wireless communication in accordance with the present disclosure. The apparatus 1200 may be a network node, or a network node may include the apparatus 1200. In some aspects, the apparatus 1200 includes a reception component 1202, a transmission component 1204, and a communication manager 1250, which may be in communication with one another (for example, via one or more buses). The communication manager 1250 may include, may be included in, or may be similar to the communication manager 150. As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 6-8. Additionally or alternatively, the apparatus 1200 may be configured to perform one or more processes described herein, such as process 1000 of FIG. 10, or a combination thereof. In some aspects, the apparatus 1200 may include one or more components of the base station described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 1250. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, the communication manager 1250 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The communication manager 1250 may detect an optical beacon of at least one UE. The communication manager 1250 may transmit or may cause the transmission component 1204 to transmit reference signals using a sweep of a plurality of beams that is based at least in part on a relative direction of the optical beacon of the at least one UE. In some aspects, the communication manager 1250 may perform one or more operations described elsewhere herein as being performed by one or more components of the communication manager 1250.

The communication manager 1250 may include a controller/processor, a memory, a scheduler, a communication unit, or a combination thereof, of the base station described above in connection with FIG. 2. In some aspects, the communication manager 1250 includes a set of components, such as a detection component 1208, a directional component 1210, a beacon component 1212, or a combination thereof. Alternatively, the set of components may be separate and distinct from the communication manager 1250. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The detection component 1208 may detect, using an image sensor, an optical beacon of at least one UE. The transmission component 1204 may transmit reference signals using a sweep of a plurality of beams that is based at least in part on a relative direction of the optical beacon of the at least one UE. The transmission component 1204 may transmit a command to activate the optical beacon of the at least one UE. The reception component 1202 may receive UE capability information indicating at least one of a capability of the at least one UE to detect an optical beacon of the network node, or a capability of the at least one UE to activate the optical beacon of the at least one UE. The directional component 1210 may determine the relative direction of the optical beacon of the at least one UE based at least in part on detecting the optical beacon of the at least one UE. The beacon component 1212 may activate an optical beacon.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: detecting, using an image sensor, an optical beacon of a network node; and receiving reference signals using a sweep of a plurality of beams that is based at least in part on a relative direction of the optical beacon of the network node.

Aspect 2: The method of Aspect 1, wherein frequencies of the plurality of beams are at least 100 gigahertz.

Aspect 3: The method of any of Aspects 1-2, wherein the optical beacon uses infrared light.

Aspect 4: The method of any of Aspects 1-3, further comprising receiving a command to activate an optical beacon of the UE.

Aspect 5: The method of any of Aspects 1-4, further comprising transmitting UE capability information indicating at least one of: a capability of the UE to detect the optical beacon of the network node, or a capability of the UE to activate an optical beacon of the UE.

Aspect 6: The method of any of Aspects 1-5, further comprising determining the relative direction of the optical beacon of the network node based at least in part on detecting the optical beacon of the network node.

Aspect 7: The method of any of Aspects 1-6, wherein detecting the optical beacon of the network node comprises: detecting the optical beacon of the network node and an optical beacon of at least one other network node; and identifying the optical beacon of the network node based at least in part on one or more differentiating characteristics associated with the optical beacon of the network node.

Aspect 8: A method of wireless communication performed by a network node, comprising: detecting, using an image sensor, an optical beacon of at least one user equipment (UE); and transmitting reference signals using a sweep of a plurality of beams that is based at least in part on a relative direction of the optical beacon of the at least one UE.

Aspect 9: The method of Aspect 8, wherein frequencies of the plurality of beams are at least 100 gigahertz.

Aspect 10: The method of any of Aspects 8-9, wherein the optical beacon uses infrared light.

Aspect 11: The method of any of Aspects 8-10, further comprising transmitting a command to activate the optical beacon of the at least one UE.

Aspect 12: The method of any of Aspects 8-11, further comprising receiving UE capability information indicating at least one of: a capability of the at least one UE to detect an optical beacon of the network node, or a capability of the at least one UE to activate the optical beacon of the at least one UE.

Aspect 13: The method of any of Aspects 8-12, further comprising determining the relative direction of the optical beacon of the at least one UE based at least in part on detecting the optical beacon of the at least one UE.

Aspect 14: The method of any of Aspects 8-13, wherein the at least one UE includes multiple UEs, and wherein the sweep of the plurality of beams is based at least in part on relative directions of multiple optical beacons of the multiple UEs.

Aspect 15: An apparatus for wireless communication at a device, comprising a processor; memory coupled with the processor; and instructions stored in the memory and executable by the processor to cause the apparatus to perform the method of one or more of Aspects 1-7.

Aspect 16: A device for wireless communication, comprising a memory and one or more processors coupled to the memory, the one or more processors configured to perform the method of one or more of Aspects 1-7.

Aspect 17: An apparatus for wireless communication, comprising at least one means for performing the method of one or more of Aspects 1-7.

Aspect 18: A non-transitory computer-readable medium storing code for wireless communication, the code comprising instructions executable by a processor to perform the method of one or more of Aspects 1-7.

Aspect 19: A non-transitory computer-readable medium storing a set of instructions for wireless communication, the set of instructions comprising one or more instructions that, when executed by one or more processors of a device, cause the device to perform the method of one or more of Aspects 1-7.

Aspect 20: An apparatus for wireless communication at a device, comprising a processor; memory coupled with the processor; and instructions stored in the memory and executable by the processor to cause the apparatus to perform the method of one or more of Aspects 8-14.

Aspect 21: A device for wireless communication, comprising a memory and one or more processors coupled to the memory, the one or more processors configured to perform the method of one or more of Aspects 8-14.

Aspect 22: An apparatus for wireless communication, comprising at least one means for performing the method of one or more of Aspects 8-14.

Aspect 23: A non-transitory computer-readable medium storing code for wireless communication, the code comprising instructions executable by a processor to perform the method of one or more of Aspects 8-14.

Aspect 24: A non-transitory computer-readable medium storing a set of instructions for wireless communication, the set of instructions comprising one or more instructions that, when executed by one or more processors of a device, cause the device to perform the method of one or more of Aspects 8-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one memory; and
at least one processor communicatively coupled with the at least one memory, the at least one processor configured to cause the UE to:
detect, using an image sensor, an optical beacon of a network node, the detection being associated with at least one of:
a timing of activation of the optical beacon of the network node,
a pattern of pulses in which the optical beacon of the network node is activated, or
a light wavelength associated with the optical beacon of the network node; and
receive reference signals using a sweep of a plurality of beams that is associated with a relative direction of the optical beacon of the network node, the plurality of beams comprising millimeter wave beams or sub-terahertz beams.

2. The UE of claim 1, wherein the optical beacon uses infrared light.

3. The UE of claim 1, wherein the at least one processor is further configured to cause the UE to receive a command to activate an optical beacon of the UE.

4. The UE of claim 1, wherein the at least one processor is further configured to cause the UE to transmit UE capability information indicating at least one of:
a capability of the UE to detect the optical beacon of the network node, or
a capability of the UE to activate an optical beacon of the UE.

5. The UE of claim 1, wherein the at least one processor is further configured to cause the UE to determine the relative direction of the optical beacon of the network node based at least in part on the detection of the optical beacon of the network node.

6. The UE of claim 1, wherein, to cause the UE to detect the optical beacon of the network node, the at least one processor is configured to cause the UE to:
detect the optical beacon of the network node and an optical beacon of at least one other network node; and
identify the optical beacon of the network node based at least in part on one or more differentiating characteristics associated with the optical beacon of the network node.

7. A network node for wireless communication, comprising:
at least one memory; and
at least one processor communicatively coupled with the at least one memory, the at least one processor configured to cause the network node to:
detect, using an image sensor, an optical beacon of at least one user equipment (UE), the detection being associated with at least one of:
a timing of activation of the optical beacon of the at least one UE,
a pattern of pulses in which the optical beacon of the at least one UE is activated, or
a light wavelength associated with the optical beacon of the at least one UE; and
transmit reference signals using a sweep of a plurality of beams that is associated with a relative direction of the optical beacon of the at least one UE, the plurality of beams comprising millimeter wave beams or sub-terahertz beams.

8. The network node of claim 7, wherein the optical beacon uses infrared light.

9. The network node of claim 7, wherein the at least one processor is further configured to cause the network node to transmit a command to activate the optical beacon of the at least one UE.

10. The network node of claim 7, wherein the at least one processor is further configured to cause the network node to receive UE capability information indicating at least one of:
a capability of the at least one UE to detect an optical beacon of the network node, or
a capability of the at least one UE to activate the optical beacon of the at least one UE.

11. The network node of claim 7, wherein the at least one processor is further configured to cause the network node to determine the relative direction of the optical beacon of the at least one UE based at least in part on the detection of the optical beacon of the at least one UE.

12. The network node of claim 7, wherein the at least one UE includes multiple UEs, and
wherein the sweep of the plurality of beams is based at least in part on relative directions of multiple optical beacons of the multiple UEs.

13. A method of wireless communication performed by a user equipment (UE), comprising:
detecting, using an image sensor, an optical beacon of a network node, the detection being associated with at least one of:
a timing of activation of the optical beacon of the network node,
a pattern of pulses in which the optical beacon of the network node is activated, or
a light wavelength associated with the optical beacon of the network node; and
receiving reference signals using a sweep of a plurality of beams that is associated with a relative direction of the optical beacon of the network node, the plurality of beams comprising millimeter wave beams or sub-terahertz beams.

14. The method of claim 13, wherein the optical beacon uses infrared light.

15. The method of claim 13, further comprising receiving a command to activate an optical beacon of the UE.

16. The method of claim 13, further comprising transmitting UE capability information indicating at least one of:
a capability of the UE to detect the optical beacon of the network node, or
a capability of the UE to activate an optical beacon of the UE.

17. The method of claim 13, further comprising determining the relative direction of the optical beacon of the network node based at least in part on detecting the optical beacon of the network node.

18. The method of claim 13, wherein detecting the optical beacon of the network node comprises:
detecting the optical beacon of the network node and an optical beacon of at least one other network node; and
identifying the optical beacon of the network node based at least in part on one or more differentiating characteristics associated with the optical beacon of the network node.

19. A method of wireless communication performed by a network node, comprising:

detecting, using an image sensor, an optical beacon of at least one user equipment (UE), the detection being associated with at least one of:
- a timing of activation of the optical beacon of the at least one UE,
- a pattern of pulses in which the optical beacon of the at least one UE is activated, or
- a light wavelength associated with the optical beacon of the at least one UE; and transmitting reference signals using a sweep of a plurality of beams that is based at least associated with a relative direction of the optical beacon of the at least one UE, the plurality of beams comprising millimeter wave beams or sub-terahertz beams.

20. The method of claim 19, wherein the optical beacon uses infrared light.

21. The method of claim 19, further comprising transmitting a command to activate the optical beacon of the at least one UE.

22. The method of claim 19, further comprising receiving UE capability information indicating at least one of:
- a capability of the at least one UE to detect an optical beacon of the network node, or
- a capability of the at least one UE to activate the optical beacon of the at least one UE.

23. The method of claim 19, further comprising determining the relative direction of the optical beacon of the at least one UE based at least in part on detecting the optical beacon of the at least one UE.

24. The method of claim 19, wherein the at least one UE includes multiple UEs, and
wherein the sweep of the plurality of beams is based at least in part on relative directions of multiple optical beacons of the multiple UEs.

* * * * *